United States Patent
Warwick (10) Patent No.: US 11,669,592 B2
(45) Date of Patent: Jun. 6, 2023

(54) SYSTEMS AND METHODS FOR RESIDUE BUNCH DETECTION

(71) Applicant: CNH Industrial America LLC, New Holland, PA (US)

(72) Inventor: Christopher Nicholas Warwick, Hertfordshire (GB)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 17/174,754

(22) Filed: Feb. 12, 2021

(65) Prior Publication Data
US 2022/0261589 A1    Aug. 18, 2022

(51) Int. Cl.
| | |
|---|---|
| *G06F 18/2413* | (2023.01) |
| *G06T 7/50* | (2017.01) |
| *G06V 10/44* | (2022.01) |
| *G06V 20/56* | (2022.01) |

(Continued)

(52) U.S. Cl.
CPC ............ *G06F 18/2413* (2023.01); *G06T 7/50* (2017.01); *G06T 7/60* (2013.01); *G06V 10/443* (2022.01); *G06V 20/56* (2022.01); *A01B 79/005* (2013.01); *G06T 2207/30188* (2013.01); *G06T 2207/30252* (2013.01)

(58) Field of Classification Search
CPC ............ G06K 9/627; G06T 7/50; G06T 7/60; G06T 2207/30188; G06T 2207/30252; G06V 10/443; G06V 20/56; A01B 79/005
See application file for complete search history.

(56) References Cited

U.S. PATENT DOCUMENTS

| | | |
|---|---|---|
| 9,213,905 B2 | 12/2015 | Lange et al. |
| 9,489,576 B2 | 11/2016 | Johnson et al. |
| 10,438,343 B2 | 10/2019 | Baurer et al. |

(Continued)

FOREIGN PATENT DOCUMENTS

WO    WO 2020/039322    2/2020

OTHER PUBLICATIONS

Beeson, P.C., Daughtry, C.S., Hunt, E.R., Akhmedov, B., Sadeghi, A.M., Karlen, D.L. and Tomer, M.D., 2016. Multispectral satellite mapping of crop residue cover and tillage intensity in Iowa. Journal of Soil and Water Conservation, 71(5), pp. 385-395.*

(Continued)

*Primary Examiner* — Zhitong Chen
(74) *Attorney, Agent, or Firm* — Rebecca Henkel; Rickard DeMille (57) ABSTRACT

In one aspect, a method for detecting residue bunches within a field includes receiving one or more images depicting an imaged portion of an agricultural field, with the imaged portion of the field being at least partially represented by a plurality of pixels within the one or more images. The method also includes classifying a portion of the plurality of pixels that are associated with crop residue within the imaged portion of the field as residue pixels, with each residue pixel being associated with a respective pixel height. Additionally, the method includes identifying each residue pixel having a pixel height that exceeds a pixel height threshold as a candidate residue bunch pixel, and determining whether a residue bunch is present within the imaged portion of the field based at least in part on the candidate residue bunch pixels.

13 Claims, 7 Drawing Sheets

(51) Int. Cl.
    *G06T 7/60*           (2017.01)
    *A01B 79/00*        (2006.01)

(56) References Cited

U.S. PATENT DOCUMENTS

| | | |
|---|---|---|
| 10,521,694 B2 | 12/2019 | Xu et al. |
| 2014/0301607 A1 | 10/2014 | Anderson et al. |
| 2015/0305224 A1 | 10/2015 | Casper et al. |
| 2017/0112043 A1 | 4/2017 | Nair et al. |
| 2019/0236359 A1* | 8/2019 | Posselius ............... A01B 76/00 |
| 2019/0377986 A1 | 12/2019 | Ferrari et al. |
| 2019/0392573 A1 | 12/2019 | Ferrari et al. |
| 2020/0329627 A1 | 10/2020 | Johnson et al. |

OTHER PUBLICATIONS

Jiang, Y., Li, C. and Paterson, A.H., 2016. High throughput phenotyping of cotton plant height using depth images under field conditions. Computers and Electronics in Agriculture, 130, pp. 57-68.*

Matsuo, T., Fukushima, N. and Ishibashi, Y., Feb. 2013, Weighted Joint Bilateral Filter with Slope Depth Compensation Filter for Depth Map Refinement. In VISAPP (2) (pp. 300-309).*

Al-Kaisi, "Methods for Measuring Crop Residue", Integrated Crop Management, Iowa State University, Dated May 13, 2002 (8 pages) https://crops.extension.iastate.edu/encyclopedia/methods-measuring-crop-residue.

Extended European Search Report for corresponding EP Application No. 22156191 dated Jul. 15, 2022 (7 pages).

* cited by examiner

SYSTEMS AND METHODS FOR RESIDUE BUNCH DETECTION

FIELD OF THE INVENTION

The present subject matter relates generally to the acquisition and analysis of surface condition data associated with an agricultural field and, more particularly, to systems and methods for detecting crop residue bunches within a field.

BACKGROUND OF THE INVENTION

Crop residue generally refers to the vegetation (e.g., straw, chaff, husks, cobs) remaining on the soil surface following the performance of a given agricultural operation, such as a harvesting operation or a tillage operation. For various reasons, it is important to maintain a given amount of crop residue within a field following an agricultural operation. Specifically, crop residue remaining within the field can help in maintaining the content of organic matter within the soil and can also serve to protect the soil from wind and water erosion. However, in some cases, leaving an excessive amount of crop residue within a field can have a negative effect on the soil's productivity potential, such as by slowing down the warming of the soil at planting time and/or by slowing down seed germination. As such, the ability to monitor and/or adjust the amount of crop residue remaining within a field can be very important to maintaining a healthy, productive field, particularly when it comes to performing tillage operations.

In this regard, vision-based systems have been previously developed that can be used to differentiate between residue and soil within images, thereby allowing for an estimate of the crop residue coverage within the field to be determined. However, these systems typically only provide a binary output (i.e., residue vs soil). In other words, in relation to the images being analyzed, conventional systems are only equipped to classify pixels as either residue or soil. As the industry advances towards more automated solutions, including fully automated agricultural machines (e.g., fully automated tractors and implements), it is generally desirable to be able to obtain more detailed information about the surface conditions within a field, such as additional information regarding the residue remaining on the soil surface, to aid in the generation of computer-implemented control actions that improve the operation and/or efficiency of an agricultural machine performing an operation within a field.

Accordingly, a system and method for detecting crop residue bunches (as opposed to simply crop residue) within a field would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a method for detecting residue bunches within a field. The method includes receiving, with a computing system, one or more images depicting an imaged portion of an agricultural field, with the imaged portion of the field being at least partially represented by a plurality of pixels within the one or more images. The method also includes classifying, with the computing system, a portion of the plurality of pixels that are associated with crop residue within the imaged portion of the field as residue pixels, with each residue pixel being associated with a respective pixel height. Additionally, the method includes identifying, with the computing system, each residue pixel having a pixel height that exceeds a pixel height threshold as a candidate residue bunch pixel, and determining, with the computing system, whether a residue bunch is present within the imaged portion of the field based at least in part on the candidate residue bunch pixels.

In another aspect, the present subject matter is directed to a system for detecting residue bunches within a field. The system includes an imaging device configured to capture one or more images depicting an imaged portion of the field, with the imaged portion of the field being at least partially represented by a plurality of pixels within the one or more images. The system also includes a computing system communicatively coupled to the imaging device. The computing system includes a processor and associated memory, with the memory storing instructions that, when implemented by the processor, configure the computing system to receive the one or more images from the imaging devices, classify a portion of the plurality of pixels that are associated with crop residue within the imaged portion of the field as residue pixels, identify each residue pixel having a pixel height that exceeds a pixel height threshold as a candidate residue bunch pixel, and determine whether a residue bunch is present within the imaged portion of the field based at least in part on the candidate residue bunch pixels.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for detecting residue bunches within an agricultural field. As will be described below, a residue bunch is generally characterized by a clump, stack, or other volume of residue pieces that extends above the soil surface or other reference point or plane by a given height. For example, when crop residue is uniformly distributed in an ideal condition, the residue pieces are generally provided in a relatively thin layer across the soil surface. However, as residue pieces accumulate, stack together, and/or otherwise "bunch up" in localized areas, the height of the resulting "residue bunch" is generally greater than the nominal height of the otherwise thin residue layer across the soil surface (also referred to herein as the "nominal residue carpet height"). Such residue bunches are often more difficult to process during a tillage operation and, thus, can result in an undesirable post-tillage surface finish that can impact subsequent agricultural operations within the field (e.g., a subsequent planting operation).

In accordance with aspects of the present subject matter, the disclosed systems and methods utilize computer vision techniques and/or image processing algorithms to detect residue bunches within imaged portions of an agricultural field. Specifically, in several embodiments, one or more imaging devices (e.g., a stereo camera assembly) are used to capture images of the field that: (1) allow the pixels within each image to be classified as residue or soil; and (2) provide depth information associated with the distance from the imaging device(s) to imaged surface features of the field (e.g., the soil surface, residue, etc.), which can then be translated to a height of such features above a given reference plane (e.g., a reference plane approximating the soil surface). By obtaining such depth information, the pixels classified as residue can be evaluated to identify any of such pixels that have an associated pixel height (e.g., relative to the reference plane or height) that exceeds a given height threshold. In one embodiment, the area associated with the residue pixels having a pixel height exceeding the height threshold can then be evaluated to determine whether a residue bunch is present within the imaged portion of the field. For instance, if the area exceeds a predetermined area threshold, it may be determined that a residue bunch has been detected.

Figure 1:
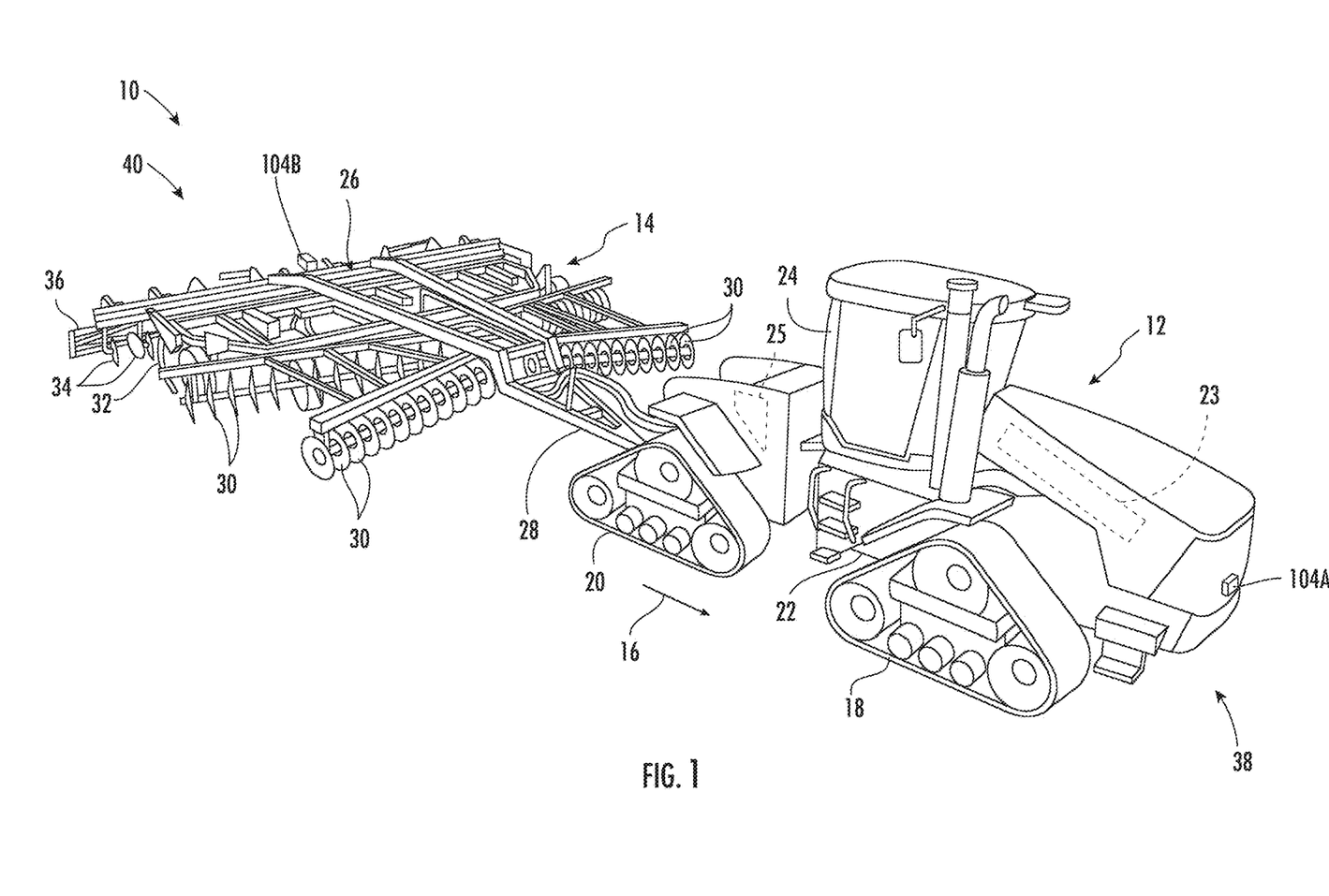
FIG. 1 illustrates a perspective view of one embodiment of an agricultural machine in accordance with aspects of the present subject matter, particularly illustrating the agricultural machine including imaging devices for capturing images of a field across which the machine is being traversed.

Referring now to drawings, FIG. 1 illustrates a perspective view of one embodiment of an agricultural machine 10 in accordance with aspects of the present subject matter. As shown, in the illustrated embodiment, the agricultural machine 10 includes a work vehicle 12 and an associated agricultural implement 14. In general, the work vehicle 12 is configured to tow the implement 14 across a field in a direction of travel (e.g., as indicated by arrow 16 in FIG. 1). In the illustrated embodiment, the work vehicle 12 is configured as an agricultural tractor and the implement 14 is configured as an associated tillage implement. However, in other embodiments, the work vehicle 12 may be configured as any other suitable type of vehicle, such as an agricultural harvester, a self-propelled sprayer, and/or the like. Similarly, the implement 14 may be configured as any other suitable type of implement, such as a planter. Furthermore, it should be appreciated that the agricultural machine 10 may correspond to any suitable powered and/or unpowered agricultural machine (including suitable vehicles and/or equipment, such as only a work vehicle or only an implement). Additionally, the agricultural machine 10 may include more than two associated vehicles, implements, and/or the like (e.g., a tractor, a planter, and an associated air cart).

As shown in FIG. 1, the work vehicle 12 includes a pair of front track assemblies 18, a pair or rear track assemblies 20, and a frame or chassis 22 coupled to and supported by the track assemblies 18, 20. An operator's cab 24 may be supported by a portion of the chassis 22 and may house various input devices for permitting an operator to control the operation of one or more components of the work vehicle 12 and/or one or more components of the implement 14. Additionally, as is generally understood, the work vehicle 12 may include an engine 23 and a transmission 25 mounted on the chassis 22. The transmission 25 may be operably coupled to the engine 23 and may provide variably adjusted gear ratios for transferring engine power to the track assemblies 18, 20 via a drive axle assembly (not shown) (or via axles if multiple drive axles are employed).

Additionally, as shown in FIG. 1, the implement 14 may generally include a carriage frame assembly 26 configured to be towed by the work vehicle 12 via a pull hitch or tow bar 28 in the direction of travel 16 of the vehicle 12. As is generally understood, the carriage frame assembly 26 may be configured to support a plurality of ground-engaging tools, such as a plurality of shanks, disk blades, leveling blades, basket assemblies, tines, spikes, and/or the like. For example, in the illustrated embodiment, the carriage frame assembly 26 is configured to support various gangs of disc blades 30, a plurality of ground engaging shanks 32, a plurality of leveling blades 34, and a plurality of crumbler wheels or basket assemblies 36. However, in alternative embodiments, the carriage frame assembly 26 may be configured to support any other suitable ground engaging tools and/or combination of ground engaging tools. In several embodiments, the various ground-engaging tools may be configured to perform a tillage operation or any other suitable ground-engaging operation across the field along which the implement 14 is being towed. It should be understood that, in addition to being towed by the work vehicle 12, the implement 14 may also be a semi-mounted implement connected to the work vehicle 12 via a two point hitch (not shown) or the implement 14 may be a fully mounted implement (e.g., mounted the work vehicle's 12 three point hitch (not shown)).

It should be appreciated that the configuration of the agricultural machine 10 described above and shown in FIG. 1 is provided only to place the present subject matter in an exemplary field of use. Thus, it should be appreciated that the present subject matter may be readily adaptable to any manner of machine configuration, including any suitable work vehicle configuration and/or implement configuration. For example, in an alternative embodiment of the work vehicle 12, a separate frame or chassis may be provided to which the engine, transmission, and drive axle assembly are coupled, a configuration common in smaller tractors. Still other configurations may use an articulated chassis to steer the work vehicle 10, or rely on tires/wheels in lieu of the track assemblies 14, 16. Similarly, as indicated above, the carriage frame assembly 26 of the implement 12 may be configured to support any other suitable combination of type of ground-engaging tools.

Furthermore, in accordance with aspects of the present subject matter, the agricultural machine 10 may include one or more imaging devices 104 coupled thereto and/or supported thereon. Each imaging device(s) 104 may, for example, be configured to capture images or other data relating to one or more conditions of the field along which the machine 10 is being traversed. Specifically, in several embodiments, the imaging device(s) 104 may be used to collect data associated with one or more surface conditions of the field, such as one or more conditions relating to crop residue, soil clods, and/or surface irregularities (e.g., ridges and/or valleys) within the field. For instance, as will be described below, the imaging device(s) may be used to collect data associated with the detection of residue bunches within the field.

In several embodiments, the imaging device(s) 104 may be provided in operative association with the agricultural machine 10 such that the imaging device(s) 104 has a field of view directed towards a portion(s) of the field adjacent to the work vehicle 12 and/or the implement 14, such as a portion(s) of the field disposed in front of, behind, and/or along one or both of the sides of the work vehicle 12 and/or the implement 14. For example, as shown in FIG. 1, in one embodiment, an imaging device(s) 104A may be provided at a forward end 38 of the work vehicle 12 to allow the imaging device(s) 104A to capture images and related data of a section of the field disposed in front of the work vehicle 12. Such a forward-located imaging device(s) 104A may allow pre-tillage images of the field to be captured for monitoring or determining surface conditions of the field (e.g., residue bunches) prior to the performance of a tillage operation. Similarly, as shown in FIG. 1, a second imaging device(s) 104B may be provided at or adjacent to an aft end 40 of the implement 14 to allow the imaging device(s) 104B to capture images and related data of a section of the field disposed behind the implement 14. Such an aft-located imaging device(s) 104B may allow post-tillage images of the field to be captured for monitoring or determining surface conditions of the field (e.g., residue bunches) after the performance of a tillage operation.

It should be appreciated that, in alternative embodiments, the imaging device(s) 104 may be installed at any other suitable location(s) on the work vehicle 12 and/or the implement 14. In addition, it should be appreciated that, in other embodiments, the agricultural machine 10 may only include a single imaging device(s) 104 mounted on either the work vehicle 12 or the implement 14 or may include more than two imaging device(s) 104 mounted on the work vehicle 12 and/or the implement 14. Moreover, it should be appreciated that each imaging device(s) 104 may be configured to be mounted or otherwise supported relative to a portion of the agricultural machine 10 using any suitable mounting/support structure. For instance, in one embodiment, each imaging device(s) may be directly or indirectly mounted to a portion of the work vehicle 12 and/or the implement 14. Specifically, in one embodiment, suitable mounting structure (e.g., mounting arms, brackets, trays, etc.) may be used to support each imaging device(s) 104 out in front of the vehicle 12 or behind the implement 14 (e.g., in a cantilevered arrangement) to allow the imaging device(s) 104 to obtain the desired field of view, including the desired orientation of the device's field of view relative to the field (e.g., a straight-down view oriented generally perpendicular to the surface of the field).

In general, the imaging device(s) 104 may correspond to any suitable device(s) or other assembly configured to capture images of the field. For instance, in several embodiments, the imaging device(s) 104 may correspond to a stereo camera assembly having first and second cameras 106, 108 (FIG. 2) incorporated therein or otherwise forming a part thereof. In such embodiments, the stereo camera assembly may be used to capture both two-dimensional and three-dimensional images of the field. Specifically, each camera may include a lens and a separate image sensor for capturing two-dimensional images. Additionally, by simultaneously capturing an image of the same portion of the field with each camera, the separate images can be combined, compared and/or otherwise processed to extract three-dimensional information about such portion of the field. For example, by comparing the images captured by each camera, a depth image can be generated that allows the scene depth to be determined (e.g., relative to the camera) at each corresponding pixel location within the imaged portion of the field, which, in turn, can be converted into a scene height (or pixel height) at each corresponding pixel location relative to a reference plane (e.g., a reference plane approximating the soil surface). As a result, the relative height of specific features or points within the field may be determined, such as the relative height of residue within the field. It should be appreciated that, in addition to a stereo camera assembly or as an alternative thereto, the agricultural machine 10 may include any other suitable type of imaging device(s) 104. For instance, suitable imaging device(s) 104 may also include single or non-stereo cameras, spectroscope cameras, multi-spectrum cameras and/or the like.

Figure 2:
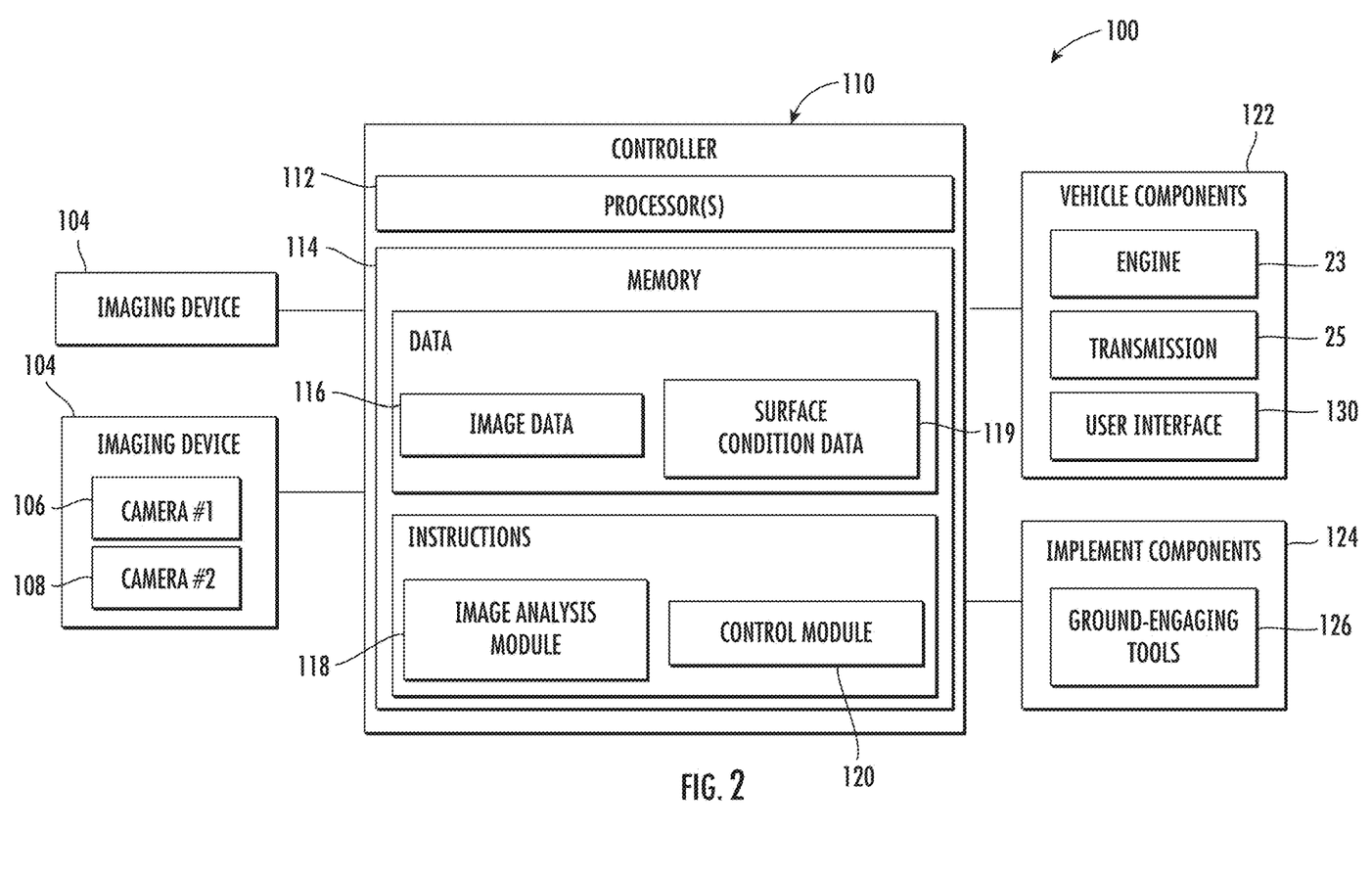
FIG. 2 illustrates a schematic view of one embodiment of a system for detecting crop residue bunches within a field in accordance with aspects of the present subject matter.

Referring now to FIG. 2, a schematic view of one embodiment of a system 100 for monitoring one or more surface conditions associated with a field is illustrated in accordance with aspects of the present subject matter. Specifically, in several embodiments, the disclosed system 100 is configured for detecting residue bunches within an agricultural field. The system 100 will generally be described herein with reference to the agricultural machine 10 described above with reference to FIG. 1. However, it should be appreciated by those of ordinary skill in the art that the disclosed system 100 may generally be utilized with agricultural machines having any other suitable machine configuration.

As shown in FIG. 2, the system 100 may include one or more imaging device(s) (e.g., the imaging devices 104 shown in FIG. 1) configured to capture images of a portion(s) of the field disposed adjacent to the work vehicle 12 and or the implement 14. As indicated above, in one embodiment, one or more of the imaging device(s) 104 may correspond to a stereo camera assembly including first and second cameras 106, 108 for capturing both two-dimensional and three-dimensional images of the field. Additionally, the system 100 may include or be associated with one or more components of the agricultural machine 10 described above with reference to FIG. 1, such as one or more components of the work vehicle 12 and/or the implement 14.

The system 100 may further include a computing system 110 communicatively coupled to the imaging device(s) 104. In several embodiments, the computing system 110 may be configured to receive and process the images captured by the imaging device(s) 104 to allow one or more surface conditions of the imaged portions of the field to be determined. For instance, the computing system 110 may be configured to execute one or more suitable image processing algorithms for detecting the presence of residue bunches within the field.

In general, the computing system 110 may comprise any suitable processor-based device known in the art, such as a computing device or any suitable combination of computing devices. Thus, in several embodiments, the computing system 110 may include one or more processor(s) 112 and associated memory device(s) 114 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 114 of the computing system 110 may generally comprise memory element(s) including, but not limited to, a computer readable medium (e.g., random access memory (RAM)), a computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 114 may generally be configured to store suitable computer-readable instructions that, when implemented by the processor(s) 112, configure the computing system 110 to perform various computer-implemented functions, such as one or more aspects of the image processing algorithm(s) and/or related method(s) described below. In addition, the computing system 110 may also include various other suitable components, such as a communications circuit or module, one or more input/output channels, a data/control bus and/or the like.

It should be appreciated that, in several embodiments, the computing system 110 may correspond to an existing controller of the agricultural machine 10 or the computing system 110 may correspond to a separate processing device. For instance, in one embodiment, the computing system 110 may form all or part of a separate plug-in module or computing device that is installed relative to the work vehicle 12 or implement 14 to allow for the disclosed system and method to be implemented without requiring additional software to be uploaded onto existing control devices of the work vehicle 12 or implement 14.

In several embodiments, the memory 114 of the computing system 110 may include one or more databases for storing information received and/or generated by the computing system 110. For instance, as shown in FIG. 2, the memory 114 may include an image database 116 storing data associated with the images captured by the imaging device(s) 104, including the images themselves and/or data deriving from the images (e.g., disparity maps or depth images generated based on the images captured by the imaging device(s) 104). Additionally, the memory 114 may include a surface condition database 119 storing data associated with the surface condition(s) being monitored by the computing system 110. For instance, as indicated above, the images and related data deriving from the imaging device(s) 104 may be used to detect the present residue bunches within the field. In such instance, any related "residue bunch" data generated by the computing system 110 may be stored within the surface condition database 119 for subsequent processing and/or analysis.

Moreover, as shown in FIG. 2, in several embodiments, the instructions stored within the memory 114 of the computing system 110 may be executed by the processor(s) 112 to implement an image analysis module 118. In general, the image analysis module 118 may be configured to process/analyze the images received from the imaging device(s) 104 and/or the data deriving therefrom to estimate or determine one or more surface conditions associated with the field. Specifically, in several embodiments, the image analysis module 118 may be configured to execute one or more image processing algorithms, such as the imaging processing algorithms described herein, to allow residue bunches to be identified by the computing system 110.

Referring still to FIG. 2, in one embodiment, the instructions stored within the memory 114 of the computing system 110 may also be executed by the processor(s) 112 to implement a control module 120. In general, the control module 120 may be configured to electronically control the operation of one or more components of the agricultural machine 10. For instance, in several embodiments, the control module 120 may be configured to control the operation of the agricultural machine 10 based on the monitored surface condition(s) of the field. Such control may include controlling the operation of one or more components 122 of the work vehicle 12, such as the engine 23 and/or the transmission 25 of the vehicle 12 to automatically adjust the ground speed of the agricultural machine 10. In addition (or as an alternative thereto), the control module 120 may be configured to electronically control the operation of one or more components 124 of the implement 14. For instance, the control module 120 may be configured to adjust the operating parameters (e.g., penetration depth, down force/pressure, etc.) associated with one or more of the ground-engaging tools 126 of the implement 14 (e.g., the disc blades 30, shanks 32, leveling blades 34, and/or basket assemblies 36) to proactively or reactively adjust the operation of the implement 14 in view of the monitored surface condition(s).

In several embodiments, the computing system 110 may also be communicatively coupled to a user interface, such as a user interface 130 housed within the cab 24 of the work vehicle 12 or at any other suitable location. The user interface 130 may be configured to provide feedback to the operator of the agricultural machine 10. Thus, the user interface 130 may include one or more feedback devices (not shown), such as display screens, speakers, warning lights, and/or the like, which are configured to communicate such feedback. In addition, some embodiments of the user interface 130 may include one or more input devices (not shown), such as touchscreens, keypads, touchpads, knobs, buttons, sliders, switches, mice, microphones, and/or the like, which are configured to receive user inputs from the operator.

It should be appreciated that, although the various control functions and/or actions will generally be described herein as being executed by the computing system 100, one or more of such control functions/actions (or portions thereof) may be executed by a separate computing system or may be distributed across two or more computing systems (including, for example, the computing system 100 and a separate computing system). For instance, in one embodiment, the computing system 100 may be configured to acquire data from the imaging device(s) 104 for subsequent processing and/or analysis by a separate computing system (e.g., a computing system associated with a remote server). In another embodiment, the computing system 100 may be configured to execute the image analysis module 118 to determine and/or monitor one or more surface conditions within the field, while a separate computing system (e.g., a vehicle computing system associated with the agricultural machine 10) may be configured to execute the control module 120 to control the operation of the agricultural machine 10 based on data and/or instructions transmitted from the computing system 100 that are associated with the monitored surface condition(s).

Figure 3:
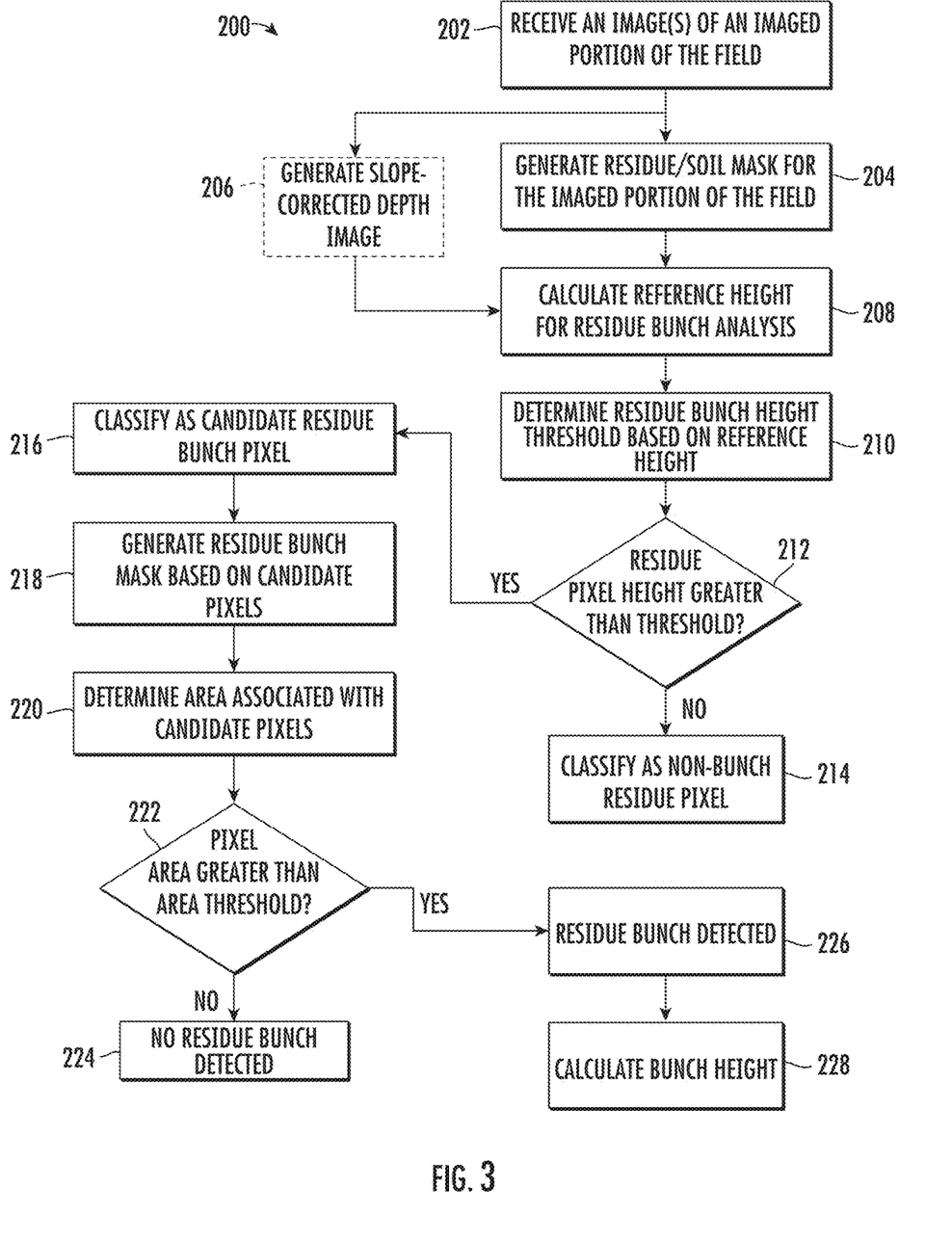
FIG. 3 illustrates a flow diagram providing one embodiment of example control logic for detecting residue bunches within imaged portions of a field in accordance with aspects of the present subject matter.

Referring now to FIG. 3, a flow diagram of one embodiment of example control logic 200 that may be executed by the computing system 110 (or any other suitable computing system) for detecting residue bunches within imaged portions of a field is illustrated in accordance with aspects of the present subject matter. Specifically, the control logic 200 shown in FIG. 3 is representative of steps of one embodiment of an image processing algorithm that can be executed to detect residue bunches within imaged portions of a field with substantial accuracy and without requiring substantial computing resources and/or processing time. Thus, in several embodiments, the control logic 200 may be advantageously utilized in association with a system installed on or forming part of an agricultural machine to allow for real-time detection of residue bunches within a field as the machine is being traversed across the field during the performance of an agricultural operation. However, in other embodiment, the control logic 200 may be used in association with any other suitable system, application, and/or the like for detecting residue bunches within a field.

As shown in FIG. 3, at (202), the control logic 200 includes receiving images of the imaged portion of the field. For example, as indicated above, the computing system 110 may be communicatively coupled to the imaging device(s) 104, thereby allowing images captured by the imaging device(s) to be transmitted to and received by the computing system 110. In several embodiments, the image(s) received of each imaged portion of the field may correspond to a depth image(s) providing depth or height information at each pixel location. For instance, when the imaging device(s) 104 comprises a stereo camera assembly, the imaging device(s) 104 may be configured to pre-process the images captured by each camera 106, 108 (FIG. 2) to form a depth image of the imaged portion of the field, which can then be transmitted to the computing system 110. Alternatively, the imaging device(s) 104 may be configured to transmit the individual images captured by each camera 106, 108 to the computing system 110, in which case the computing system 110 may be configured to combine, compare and/or otherwise process the images to generate the depth image. Regardless, the depth image may generally provide a pixel height value for each pixel within the image being analyzed, which can then be used by the computing system 110 to detect the presence of residue bunches within the imaged portion of the field.

Figure 4:
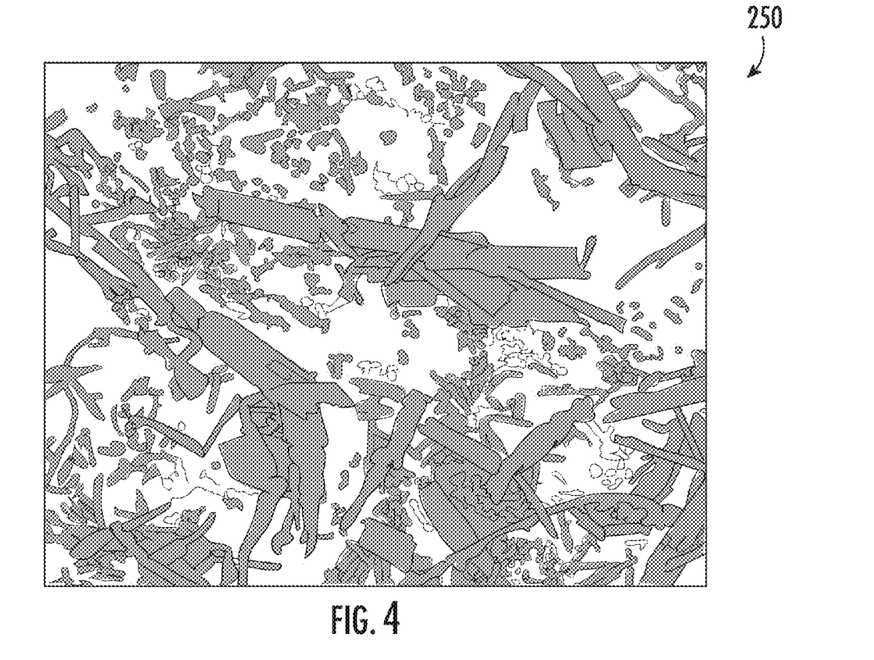
FIG. 4 illustrates an example residue mask that identifies "residue pixels" (as opposed to "soil pixels") within an image of a field in accordance with aspects of the present subject matter.

At (204), the control logic 200 includes generating a residue/soil mask associated with the imaged portion of the field. Specifically, the computing system 110 may be configured to analyze the image(s) of the imaged portion of the field using one or more image processing algorithms to distinguish soil from crop residue within the image(s), thereby allowing the computing system 110 to classify each pixel within the image(s) as a soil pixel or a residue pixel. For instance, FIG. 4 illustrates an example residue mask 250 associated with an imaged portion of a field in which the residue pixels are shaded to indicate the crop residue within the field, with the remainder of the pixels (i.e., the soil pixels) that are not shaded being indicative of soil within the field. A similar soil mask can also be generated in the same manner.

It should be appreciated that the computing system 110 may be configured to utilize any suitable image processing algorithm(s) to distinguish soil from crop residue within each image being processed. For instance, in one embodiment, a texture-based algorithm may be utilized that relies on the orientations of image gradients to differentiate residue pixels from soil pixels. Specifically, residue regions are typically characterized by a high number of gradients in the same direction due to the straightness of the residue pieces, whereas soil gradients are more randomly oriented. Thus, by identifying the gradient orientations within the images, the pixels can be analyzed and classified as residue/soil pixels. In another embodiment, a color-based algorithm may be utilized that relies on color differences to differentiate between residue and soil pixels. In a further embodiment, when the imaging device(s) 104 is capable of capturing the distinction between the reflective characteristics of the soil/residue, an algorithm may be used that identifies the differences in the reflectivity or spectral absorption between the soil and crop residue contained within each image.

Referring back to FIG. 3, at (206), the control logic 200 may also include the generation of a slope-corrected depth image. Specifically, in one embodiment, the depth or height information associated with the depth image received from the imaging device(s) 104 (or generated based on the images received from the imaging device(s) 104) may be corrected or adjusted based on an estimated slope of the imaged portion of the field. An example algorithm or control logic for generating a slope-corrected depth image will be described below with reference to FIGS. 6-8.

At (208), the control logic 200 includes calculating a reference plane or height to be used for analyzing the residue pixels contained within a given image to determine whether any residue bunches are present within the imaged portion of the field. Such calculation may be performed using the original depth image received from (or deriving from images transmitted by) the imaging device(s) 104 or using the slope-corrected depth image (e.g., as calculated at (206)).

In several embodiments, the reference height may correspond to an estimated "nominal residue carpet height" of the residue layer extending across the soil surface. To estimate the "nominal residue carpet height", the computing system 110 may, in one embodiment, be configured to determine an estimated soil height of the soil contained within the imaged portion of the field and then add a predetermined height value (e.g., three inches) to such estimated soil height. In this regard, the predetermined height value may correspond to a fixed value or may be selected or determined based on the current residue conditions within the field. For instance, in one embodiment, the predetermined height value may correspond to an operator-selected value based on observed conditions associated with the residue carpet or layer across the field. In another embodiment, the predetermined height value may be calculated based on sensed surface conditions associated with the residue within the field.

It should be appreciated that the computing system 110 may be configured to determine the estimated soil height of the soil contained within the imaged portion of the field using any suitable methodology. In one embodiment, the computing system 110 may be configured to estimate the soil height by calculating an average height of the soil pixels within the image. For instance, as indicated above, each pixel within the depth image may be associated with a pixel height. Thus, by averaging the pixel heights associated with the previously classified or identified soil pixels, an average soil height may be calculated that can then be summed with the predetermined height value to determine the nominal residue carpet height. Alternatively, the computing system 110 may be configured to analyze the pixel heights of the residue pixels contained within the image to determine a height distribution of such residue pixels. The soil height may then be estimated as corresponding to a height value associated with a lower percentile of the residue height distribution (e.g., the $1^{st}$ percentile of the residue height distribution), which may then be summed with the predetermined height value to determine the nominal residue carpet height. The use of such a residue-based soil height estimate may be particularly advantageous for images that depict primarily crop residue and, thus, contained a limited number of soil pixels for analysis.

Referring still to FIG. 3, at (210), the control logic 200 includes determining a residue bunch height threshold (or simply "height threshold") based on the reference height (e.g., as calculated at (208)). For instance, in embodiments in which the reference height corresponds to the nominal residue carpet height, a height threshold will generally be selected that is above the nominal residue carpet height by a given amount, thereby allowing for the detection of residue bunches that have heights exceeding the nominal residue carpet height by such amount. For instance, in one embodiment, an offset height value (e.g., one inch) may be added to the reference height to set the height threshold. In such an embodiment, the offset height value may correspond to a fixed value or may be selected or determined based on the current residue conditions within the field. For instance, in one embodiment, the offset height value may correspond to an operator-selected value based on observed conditions or a value that is calculated based on sensed surface conditions associated with the residue within the field.

At (212), the control logic 200 includes determining whether the pixel height of each residue pixel contained within the image exceeds the height threshold (e.g., as calculated at (210)). Specifically, in several embodiments, the computing system 110 may be configured to compare the pixel height associated with each previously identified residue pixel to the corresponding height threshold. If the pixel height associated with a given residue pixel is less than or equal to the height threshold, the computing system 110 may be configured to classify (e.g., at 214) such residue pixel as a "non-bunch residue pixel." However, if the pixel height associated with a given residue pixel is greater than the height threshold, the computing system 110 may be configured to classify (e.g., at 216) such residue pixel as a "candidate residue bunch pixel." Thus, the computing system 110 may be configured to analyze the residue pixels contained within the image in view of the height threshold and classify each pixel as either a "non-bunch residue pixel" or a "candidate residue bunch pixel." As will be described below, the candidate residue bunch pixels may then be analyzed to determine whether such pixels are in fact associated with a residue bunch within the imaged portion of the field.

Referring still to FIG. 3, at (218), the control logic 200 includes generating a residue bunch mask based on the candidate residue bunch pixels (e.g., as identified at (216)).

Figure 5:
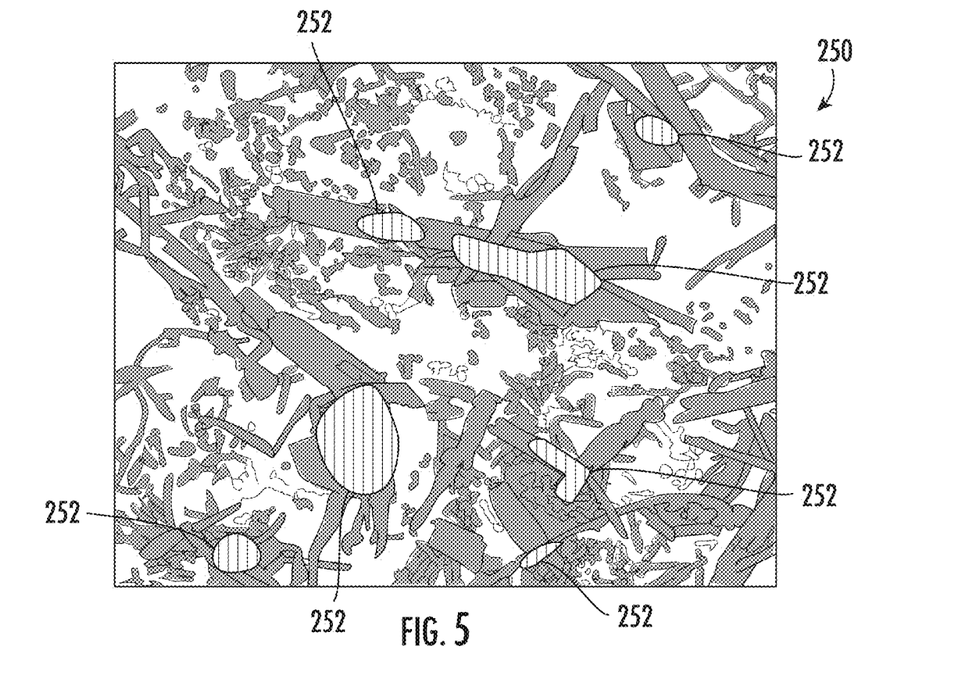
FIG. 5 illustrates another example of the residue mask shown in FIG. 4 in which all the "residue pixels" with pixel heights exceeding a given threshold have been identified as candidate residue bunch pixels in accordance with aspects of the present subject matter.

In general, the residue bunch mask may be used to map the pixels within the image that are potentially associated with a residue bunch (i.e., the candidate residue bunch pixels), thereby allowing localized areas of such pixels to be easily identified and analyzed. For instance, FIG. 5 illustrates the residue mask 250 shown in FIG. 4 with the residue bunch mask superimposed over such mask 250. As shown, the candidate residue bunch pixels are identified in FIG. 5 by the cross-hatched regions 252. As a result, the pixel regions 252 identify the areas within the image where residue pixels exist having pixel heights that exceed the height threshold and, thus, are potentially associated with a residue bunch. Additionally, in one embodiment, morphological opening and closed operations may be performed on the binary mask representing the candidate residue bunch pixels.

At (220), the control logic 200 includes determining an area associated with the candidate residue bunch pixels. Specifically, in several embodiments, the computing system 110 may be configured to determine the pixel area associated with the previously identified candidate residue bunch pixels. For instance, the computing system 100 may be configured to analyze the residue bunch mask to determine the pixel areas associated with the pixel regions 252 contained within such mask.

Additionally, at (222), the control logic 200 includes determining whether an area associated with the candidate residue bunch pixels exceeds a predetermined area threshold. If the area associated with the candidate residue bunch pixels is less than or equal to the area threshold, the computing system 110 may be configured to determine (e.g., at 224) that a residue bunch is not present within the imaged portion of the field. However, if the area associated with the candidate residue bunch pixels is greater than the area threshold, the computing system 110 may be configured to determine (e.g., at 226) that a residue bunch is present within the imaged portion of the field. It should be appreciated that the area threshold may generally correspond to a fixed value or may be selected or determined based on the current residue conditions within the field. For instance, in one embodiment, the area threshold may correspond to an operator-selected value based on observed conditions or a value that is calculated based on sensed surface conditions associated with the residue within the field.

It should be appreciated that, in one embodiment, the predetermined area threshold may be used to evaluate the entirety of the portion of the field contained within the image. In such an embodiment, the predetermined area threshold may correspond to an area threshold selected for evaluating the total pixel area associated with the candidate residue bunch pixels. Specifically, the total pixel area of the candidate residue bunch pixels may be determined and then compared to the associated area threshold to determine whether the identified candidate residue bunch pixels, as a whole, generally indicate the presence of a residue bunch within the imaged portion of the field. Alternatively, the predetermined area threshold may be used to evaluate smaller sections of the portion of the field contained within the image. For instance, in one embodiment, the predetermined area threshold may correspond to an area threshold selected for evaluating the pixel area associated with a localized region or continuous area of candidate residue bunch pixels (e.g., the pixel regions 252 associated with the residue bunch mask). In such an embodiment, the pixel area associated with a given localized region of candidate residue bunch pixels may be determined and then compared to the associated area threshold to determine whether such localized region should be classified as a residue bunch.

Moreover, when a residue bunch is detected within the imaged portion of the field, the control logic 200 may, at (228), including calculating a height of the detected residue bunch. In one embodiment, the computing system 110 is configured to calculate the "bunch height" for a given residue bunch by initially determining the average pixel height of the candidate residue bunch pixels forming part of such residue bunch (i.e., all the candidate residue bunch pixels when residue bunches are being detected based on the total pixel area of such pixels or a portion of the candidate residue bunch pixels when residue bunches are being detected based on the pixel area associated with a localized region of the candidate residue bunch pixels). The previously determined reference height (e.g., the nominal residue carpet height) is then subtracted from the average pixel height to determine the bunch height for the residue bunch. The resulting value, thus, provides a general indication of how high the detected residue bunch extends over the average or nominal height of the normal residue carpet extending across the field. As an alternative to the average pixel height of the candidate residue bunch pixels, the bunch height may, instead, be calculated as a function of a specific percentile of the pixel heights of the candidate residue bunch pixels.

It should be appreciated that, upon detection of a residue bunch, the computing system 110 may be configured to perform any number of follow-up actions, including storing data associated with the detected residue bunch within its memory 114 and/or transmitting such data to a separate computing device (e.g., a remote server and/or a computing device associated with a corresponding agricultural machine, such as a vehicle controller). Such actions may also include generating a notification for display to an operator (e.g., via the associated user interface 130) that provides information associated with the detection of residue bunches, such as the location, number, and/or height of any detected residue bunches.

Additionally, as indicated above, the computing system 110 (or a separate computing system) may be configured to control the operation of an associated agricultural machine based on the detection of residue bunches. For instance, when the imaging device(s) 104 are installed on an agricultural machine, the present subject matter may allow for real-time detection of residue bunches within a field as the machine traverses the field during the performance of an agricultural operation. In such an embodiment, adjustments of the operation of the agricultural machine may be made in real-time or on-the-fly in response to the detection of residue bunches. For example, when the agricultural machine includes a tillage implement configured to perform tillage operation within the field (e.g., the implement 14 shown in FIG. 1), real-time or on-the-fly adjustments may be made to the tillage parameters associated with the ground-engaging tools of the implement, such as by adjusting the penetration depth, down pressure/force, angle-of-attack, and/or the like of one or more of the ground-engaging tools.

Moreover, in embodiments in which the disclosed system is configured to capture both pre-tilled and post-tilled images of the field, the computing system 110 may be configured to compare and contrast the pre-tilled and post-tilled images to assess the effectiveness of a tillage implement in breaking-up or dispersing the residue bunches. For instance, when a residue bunch is detected in a pre-tilled image of a given imaged portion of the field, a corresponding post-tilled image of such portion of the field may also be captured to determine whether the detected residue bunch still exists within the field. To the extent the residue bunch is still present, the post-tilled area and/or height associated with such bunch can be compared to the pre-tilled area and/or height to determine if the area/height of the bund was reduced and, if so, to what extent.

Figure 6:
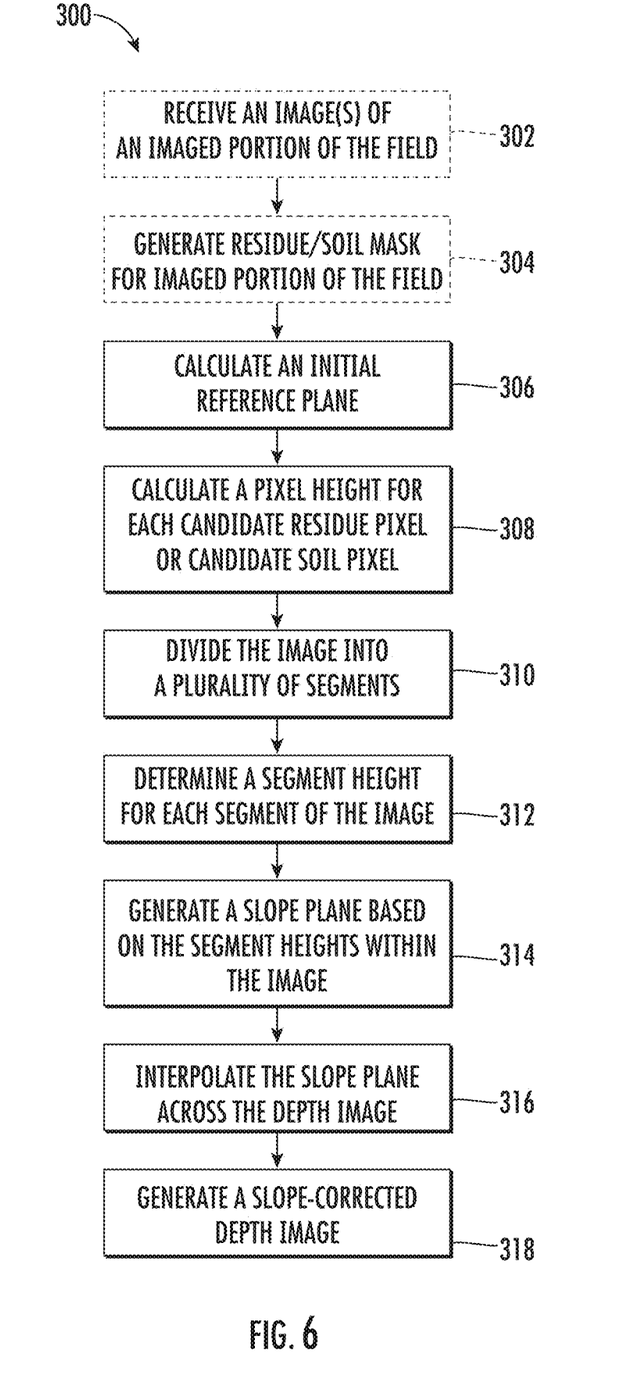
FIG. 6 illustrates a flow diagram providing one embodiment of example control logic for generating slope-corrected depth images in accordance with aspects of the present subject matter.

Referring now to FIG. 6, a flow diagram of one embodiment of example control logic 300 that may be executed for generating a slope-corrected depth image is illustrated in accordance with aspects of the present subject matter. As indicated above, a slope-corrected depth image may, in several embodiments, be used as an input within the control logic 200 described above with reference to FIG. 3. The control logic 300 shown in FIG. 6 is generally representative of steps of an image processing algorithm that can be executed to generate a slope-corrected depth image within imaged portions of a field with greater accuracy and without requiring substantial computing resources and/or processing time.

Figure 7:
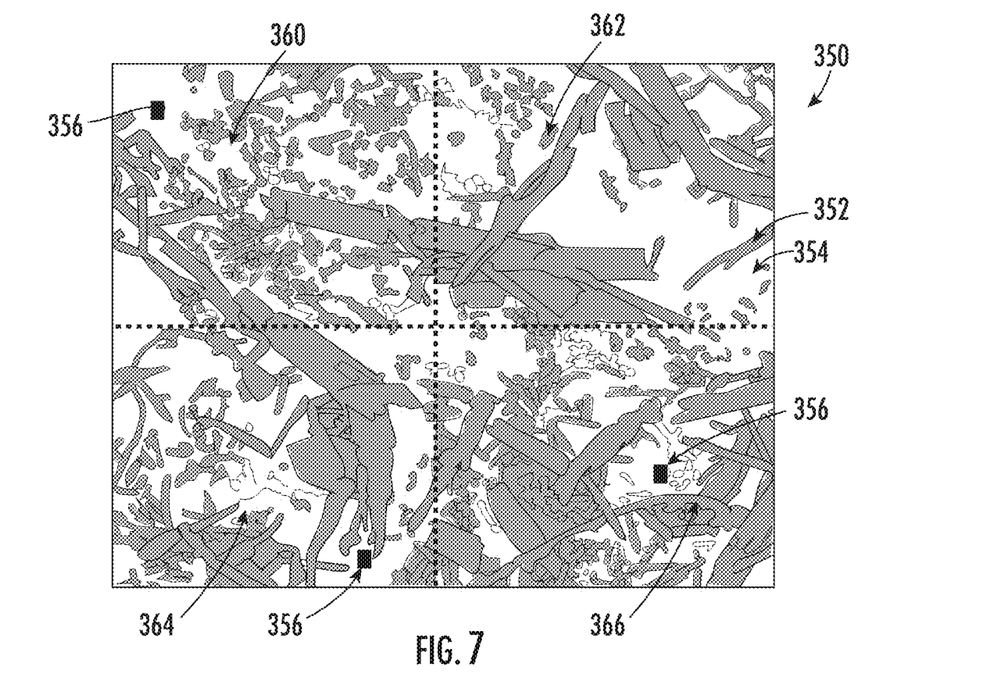
FIG. 7 illustrates another example residue mask that identifies "residue pixels" (as opposed to "soil pixels") within an image of a field in accordance with aspects of the present subject matter.

At (302) and (304), the control logic 300 includes receiving images of an imaged portion of the field and generating a residue/soil mask associated with the imaged portion of the field. As described above with reference to the control logic 200 shown in FIG. 3, the computing system 110 may be configured to analyze the image(s) received from the imaging device(s) 104 using one or more image processing algorithms to distinguish soil from crop residue within the image(s), thereby allowing the computing system 110 to classify each pixel within the image(s) as a soil pixel or a residue pixel. For instance, FIG. 7 illustrates another example residue mask 350 associated with an imaged portion of a field in which the residue pixels are shaded to indicate the crop residue 352 within the field, with the unshaded pixels (i.e., the soil pixels) being indicative of soil 354 within the field. It will be appreciated that additional masks can also be generated in the same manner. For example, the computing system 110 may also be capable of generating a foreign object mask (e.g., pixels not corresponding to residue or soil pixels), with the detected foreign objects being used or removed from any further steps within the algorithm.

Referring back to FIG. 6, at (306), the control logic 300 includes calculating an initial reference plane to be used for analyzing the pixels contained within a given image to determine whether any stem pixels (e.g., upright/near-vertical stems) are present within the imaged portion of the field. In several embodiments, the computing system 110 may be configured to estimate the initial reference plane by calculating an average height of the pixels within the image or a portion of the pixels within the image (e.g., by only using the residue pixels and/or the soil pixels). As indicated above, each pixel within the depth image may be associated with a pixel height. In some embodiments, pixels having a height that is above a predetermined threshold relative to the initial reference plane may be classified as stem pixels. For instance, FIG. 7 illustrates a stem mask 356 superimposed or overlaid onto the residue mask 350 in which the stem pixels are identified. It should be appreciated that the computing system 110 may be configured to determine the stem pixels contained within the imaged portion of the field using any other suitable methodology without departing from the scope of the present disclosure.

Additionally, at (308), the control logic 300 includes calculating a pixel height for each residue pixel or soil pixel. As indicated above, each pixel within the depth image may be associated with a pixel height. In several embodiments, the computing system 110 may use the height of each soil pixel as a ground height of that pixel. In various embodiments, the computing system 110 may determine the ground height of each residue pixel by subtracting the nominal residue carpet height (the calculation of which was described above) from the residue pixel height.

Moreover, at step (310), the control logic 300 includes dividing the image into a plurality of segments. Specifically, in several embodiments, the computing system 110 may be configured to split the image to a grid of segments. For example, as illustrated in FIG. 7, the image may be split into four segments 360, 362, 364, 366 each having a generally common number of image pixels. It will be appreciated that the image may be divided into any number of segments without departing from the scope of the present disclosure.

Referring still to FIG. 6, at step (312), the control logic 300 includes determining a segment height for each segment of the image. Specifically, in several embodiments, when a segment of the image includes at least a predefined percentage (e.g., 80 percent) of pixels that have a calculated ground height (e.g., pixels that have been classified as soil pixels or residue pixels (versus stem pixels)), the computing system 110 may be configured to calculate a segment height of that segment of the image. In some embodiments, the computing system 110 may calculate a segment height by sorting the ground heights of each of the soil pixels and residue pixels, in combination, based on the ground heights of each pixel and using a predefined percentile (e.g., $5^{th}$ percentile) as the respective segment height. In other embodiments, the computing system 110 may calculate each segment height based on an average height of a percentage of the ground heights of each of the soil pixels and residue pixels within the segment of the image. In some instances, the percentage of ground heights of each of the soil pixels and residue pixels within the segment may be less than all of the ground heights of each of the soil pixels and residue pixels within the segment to remove outlying (noise) pixels from the dataset representing each respective segment of the image. For example, in some embodiments, the segment height may be calculated while removing the tallest five percent (or any other percentage) of soil pixels and/or residue pixels.

When a segment of the image includes less than the predefined percentage of pixels that have been classified as soil pixels or residue pixels (versus stem pixels), the computing system 110 may be configured to calculate a segment height of such segments as the mean of the remaining segments that include at least the predefined percentage of pixels that have been classified as soil pixels or residue pixels. In other embodiments, when a segment of the image includes less than the predefined percentage of pixels that have been classified as soil pixels or residue pixels, the segment height may be calculated based on an average of the surrounding segment heights, sensed surface conditions associated the field and/or a predefined height, such as a height of the initial reference plane (e.g., as calculated at (306)).

Figure 8:
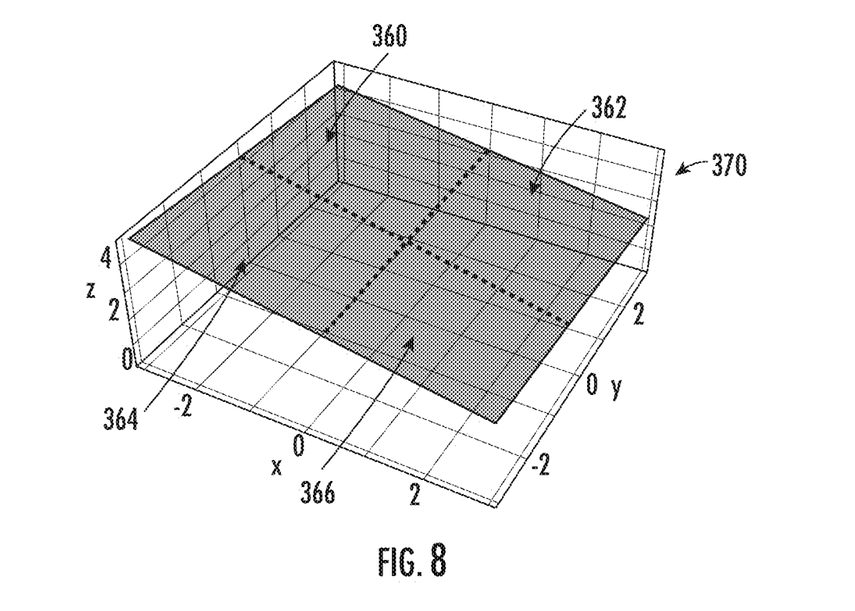
FIG. 8 illustrates an example slope plane associated with an imaged portion of a field in which the slope plane intersects calculated heights of different segments of the associated image in accordance with aspects of the present subject matter.
Figure 9:
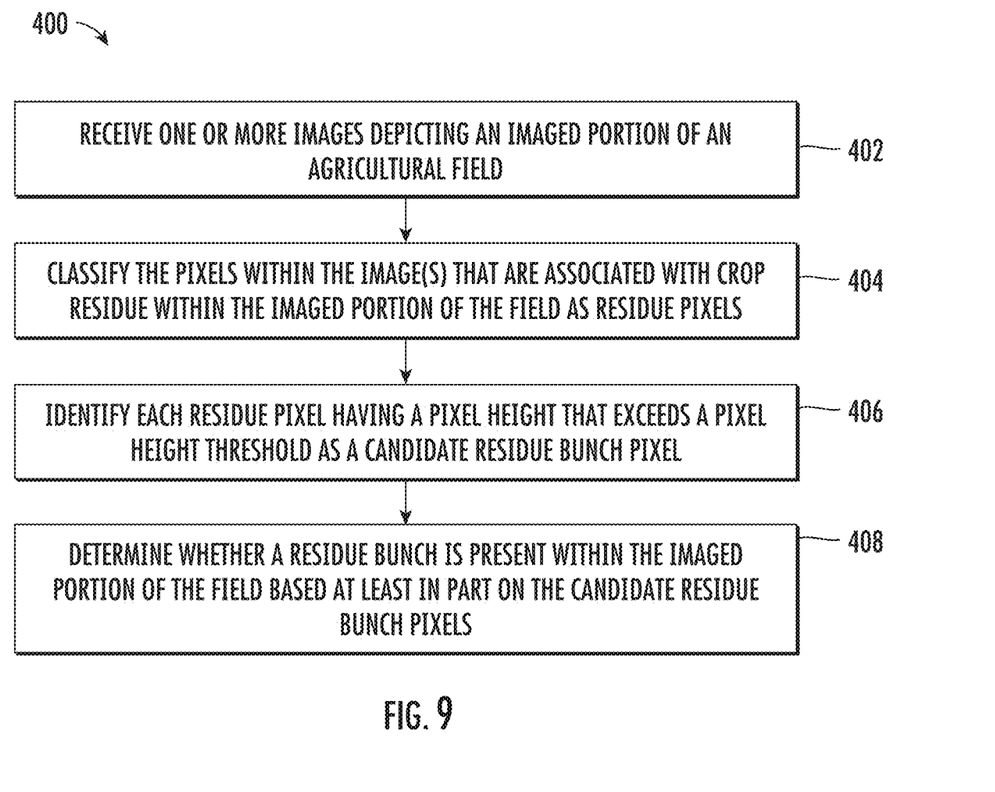
FIG. 9 illustrates a flow diagram of one embodiment of a method for detecting crop residue bunches within a field in accordance with aspects of the present subject matter.

At (314), the control logic 300 includes generating a slope plane based on the segment heights within the image. Specifically, the computing system 110 may be configured to use any practicable algorithm to determine a best fit slope plane. For example, the computing system 110 may be configured to use a least squares fit to fit a slope plane to the points calculated that form the grid (e.g., a 2×2 grid formed by the four segments 360, 362, 364, 366 of FIG. 19). In such instances, the least squares fit may be used to calculate an x intercept, an x gradient, a y intercept, and a y gradient. For instance, FIG. 8 illustrates an example slope plane associated with an imaged portion of a field based on the x intercept, the x gradient, the y intercept, and the y gradient. It will be appreciated, however, that any other method may be used for generating a slope plane based on the segment heights within the image without departing from the scope of the present disclosure.

Referring back to FIG. 6, at step (316), the control logic 300 includes interpolating the slope plane across the depth image. Specifically, the computing system 110 may be configured to renormalize the x and y gradient values by a ratio of the grid resolution and a depth image resolution (respectively for each of x and y dimensions). For instance, in embodiments that utilize the x intercept, the x gradient, the y intercept, and the y gradient to determine the slope plane, the computing system 110 may be configured to calculate, for each pixel in the depth image, a slope height from its pixel coordinates.

Moreover, at step (318), the control logic 300 includes generating a slope-corrected depth image by modifying the pixel height for each soil pixel and residue pixel within the image based on the offset from the slope plane at each pixel (e.g., by subtracting or adding the offset to the pixel height for each soil/residue pixel depending on whether the slope plane is above/below the reference plate at such pixel). By using the slope-corrected depth image, the computing system 110 may be able to detect one or more surface conditions of the field within the field with greater accuracy and without requiring substantial computing resources and/or processing time.

Referring now to FIG. 7, a flow diagram of one embodiment of a method 400 for detecting residue bunches within a field is illustrated in accordance with aspects of the present subject matter. In general, the method 400 will be described herein with reference to the agricultural machine 10 shown in FIG. 1 and the various system components shown in FIG. 2. However, it should be appreciated that the disclosed method 400 may be implemented with agricultural machines having any other suitable machine configurations and/or within systems having any other suitable system configuration. In addition, although FIG. 7 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 7, at (402), the method 400 may include receiving one or more images depicting an imaged portion of an agricultural field. For instance, as described above, the computing system 110 may be communicatively coupled to the imaging device(s) 104, thereby allowing images captured by the imaging device(s) to be transmitted to and received by the computing system 110. Such images may, for example, include depth images or pairs of two-dimensional images that can be compared or otherwise processed to generate corresponding depth images.

Additionally, at (404), the method 400 may include classifying the pixels contained within the image(s) that are associated with crop residue within the imaged portion of the field as residue pixels. As indicated above, the computing system 110 may be configured to analyze the image(s) received from the imaging device(s) 104 to differentiate between crop residue and soil contained within the imaged portion of the field. For instance, as a result of the analysis, each pixel within the image(s) may be classified as a soil pixel or a residue pixel. Such a classification may allow for a residue mask (e.g., the mask 250 shown in FIG. 4) to be generated that identifies each residue pixel within the image(s).

Moreover, at (406), the method 400 may include identifying each residue pixel having a pixel height that exceeds a pixel height threshold as a candidate residue bunch pixel. For example, as indicated above, the computing system 110 may be configured to compare the pixel height of each residue pixel to a corresponding height threshold (e.g., as determined as a function of a baseline or reference height calculated for the image(s)). Each residue pixel having a pixel height that exceeds the pixel height threshold may then be classified or identified as a candidate residue bunch pixel.

Referring still to FIG. 7, at (408), the method 400 may include determining whether a residue bunch is present within the imaged portion of the field based at least in part on the candidate residue bunch pixels. For example, as indicated above, the computing system 110 may be configured to conduct an area-based analysis on the candidate residue bunch pixels to determine whether a residue bunch is present within the imaged portion of the field. Specifically, in one embodiment, the total pixel area associated with the candidate residue bunch pixels may be compared to a predetermined pixel area threshold. In the event that the total area associated with the candidate residue bunch pixels exceeds the predetermined pixel area threshold, it may be inferred or determined that a residue bunch is present within the imaged portion of the field.

It is to be understood that the steps of the control logic 200, 300 and method 400 are performed by a computing system (e.g., computing system 110) upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the computing system described herein, such as the control logic 200, 300 and method 400, is implemented in software code or instructions which are tangibly stored on a tangible computer readable medium. The computing system loads the software code or instructions via a direct interface with the computer readable medium or via a wired and/or wireless network. Upon loading and executing such software code or instructions by the computing system, the computing system may perform any of the functionality of the computing system described herein, including any steps of the control logic 200, 300 and method 400 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for detecting residue bunches within a field, the method comprising:
   receiving, with a computing system, a depth image depicting an imaged portion of an agricultural field, the imaged portion of the field being at least partially represented by a plurality of pixels within the depth;
   classifying, with the computing system, a portion of the plurality of pixels that are associated with crop residue within the imaged portion of the field as residue pixels, each residue pixel being associated with a respective pixel height;
   classifying, with the computing system, another portion of the plurality of pixels that are associated with soil within the imaged portion of the field as soil pixels, each soil pixel being associated with a respective pixel height;
   determining, with the computing system, a reference height based at least in part on an average height of the soil calculated as a function of the pixel heights of the soil pixels;
   defining, with the computing system, a pixel height threshold based at least in part on the reference height;
   identifying, with the computing system, each residue pixel having a pixel height that exceeds the pixel height threshold as a candidate residue bunch pixel; and
   determining, with the computing system, whether a residue bunch is present within the imaged portion of the field based at least in part on the candidate residue bunch pixels.

2. The method of claim 1, further comprising generating, with the computing system, a slope-corrected depth image in which the depth image is corrected based on an estimated slope of the imaged portion of the field, the pixel height of each of the plurality of pixels deriving from the slope-corrected depth image.

3. The method of claim 1, wherein defining the pixel height threshold comprises setting the pixel height threshold as a summation of the reference height and a predetermined height value.

4. The method of claim 1, wherein determining whether a residue bunch is present within the imaged portion of the field comprises:
   determining an area associated with the candidate residue bunch pixels;
   comparing the area to a predetermined area threshold; and
   determining that a residue bunch is present within the imaged portion of the field when the area associated with the candidate residue bunch pixels exceeds the predetermined area threshold.

5. The method of claim 4, further comprising:
   generating, with the computing system, a residue bunch mask of the candidate residue bunch pixels, the area associated with the candidate residue bunch pixels comprising a pixel area of the candidate residue bunch pixels within the residue bunch mask.

6. The method of claim 1, further comprising, when it is determined that a residue bunch is present within the imaged portion of the field, calculating a height associated with the detected residue bunch.

7. The method of claim 1, wherein receiving the depth image comprises receiving the depth image from an imaging device supported relative to an agricultural machine, the depth image being captured by the imaging device as the agricultural machine travels across the field.

8. The method of claim 7, further comprising initiating, with the computing system, a control action associated with adjusting an operation of the agricultural machine based at least in part on the determination that a residue bunch is present within the imaged portion of the field.

9. A system for detecting residue bunches within a field, the system comprising:
    an imaging device configured to capture a depth image depicting an imaged portion of the field, the imaged portion of the field being at least partially represented by a plurality of pixels within the depth image; and
    a computing system communicatively coupled to the imaging device, the computing system including a processor and associated memory, the memory storing instructions that, when implemented by the processor, configure the computing system to:
    receive the from the imaging devices;
    classify a portion of the plurality of pixels that are associated with crop residue within the imaged portion of the field as residue pixels, each residue pixel being associated with a respective pixel height;
    classify another portion of the plurality of pixels that are associated with soil within the imaged portion of the field as soil pixels, each soil pixel being associated with a respective pixel height;
    determine a reference height based at least in part on an average height of the soil calculated as a function of the pixel heights of the soil pixels;
    define a pixel height threshold based at least in part on the reference height;
    identify each residue pixel having a pixel height that exceeds the pixel height threshold as a candidate residue bunch pixel; and
    determine whether a residue bunch is present within the imaged portion of the field based at least in part on the candidate residue bunch pixels.

10. The system of claim 9, wherein the computing system is further configured to determine an area associated with the candidate residue bunch pixels and compare the area to a predetermined area threshold, the computing system being configured to determine that a residue bunch is present within the imaged portion of the field when the area associated with the candidate residue bunch pixels exceeds the predetermined area threshold.

11. The system of claim 10, wherein the computing system is further configured to generate a residue bunch mask of the candidate residue bunch pixels, the area associated with the candidate residue bunch pixels comprising a pixel area of the candidate residue bunch pixels within the residue bunch mask.

12. The system of claim 9, wherein, when it is determined that a residue bunch is present within the imaged portion of the field, the computing system is further configured to calculate a height associated with the detected residue bunch.

13. The system of claim 9, wherein:
    the imaging device is supported relative to an agricultural machine such that the depth image is are captured as the agricultural machine travels across the field; and
    the computing system is further configured to initiate a control action associated with adjusting an operation of the agricultural machine based at least in part on the determination that a residue bunch is present within the imaged portion of the field.

\* \* \* \* \*